(12) United States Patent
Wei et al.

(10) Patent No.: US 10,778,085 B2
(45) Date of Patent: Sep. 15, 2020

(54) POWER CONVERTER, POWER CONVERSION METHOD AND LIGHTING APPARATUS

(71) Applicant: Current Lighting Solutions, LLC, East Cleveland, OH (US)

(72) Inventors: Hongbin Wei, Shanghai (CN); Qian Ni, Shanghai (CN); Longyu Chen, Shanghai (CN); Aling Li, Shanghai (CN)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 16/214,311

(22) Filed: Dec. 10, 2018

(65) Prior Publication Data
US 2019/0190396 A1    Jun. 20, 2019

(30) Foreign Application Priority Data
Dec. 11, 2017    (CN) .......................... 2017 1 1307119

(51) Int. Cl.
*H02M 1/36*    (2007.01)
*H02M 3/335*    (2006.01)
*H05B 45/385*    (2020.01)

(52) U.S. Cl.
CPC ......... *H02M 1/36* (2013.01); *H02M 3/33507* (2013.01); *H05B 45/385* (2020.01)

(58) Field of Classification Search
CPC .... H02M 1/36; H02M 3/335; H02M 3/33507; H02M 3/33523
See application file for complete search history.

(56) References Cited

U.S. PATENT DOCUMENTS

| | | | | |
|---|---|---|---|---|
| 5,359,281 A * | 10/1994 | Barrow | .................. | H02M 1/36 323/284 |
| 8,395,329 B2 * | 3/2013 | Jutras | ................. | H05B 33/0851 315/246 |
| 2009/0185397 A1 * | 7/2009 | Forghani-zadeh | ...... | H02M 1/36 363/18 |

* cited by examiner

*Primary Examiner* — Gary L Laxton
(74) *Attorney, Agent, or Firm* — Buckley, Maschoff & Talwalkar LLC (57) ABSTRACT

A power converter comprising a first capacitor, a flyback conversion module, a soft-start module, and a feedback control module. The flyback conversion module is coupled with the first capacitor and configured to receive a first control voltage across the first capacitor. The soft-start module is coupled with the first capacitor and is configured to charge the first capacitor during a startup stage, to increase the first control voltage to an expected voltage value at the end of the startup stage. The feedback control module is coupled with the flyback conversion module and is configured to control the flyback conversion module to output a substantially constant voltage or current after the startup stage. Wherein the expected voltage value is a value of the first control voltage when the flyback conversion module outputs a substantially constant voltage or current after the startup stage.

13 Claims, 7 Drawing Sheets

POWER CONVERTER, POWER CONVERSION METHOD AND LIGHTING APPARATUS

TECHNICAL FIELD

Embodiments of the present invention relate to a power converter, a power conversion method, and a lighting apparatus.

BACKGROUND

The flyback converter has a simple isolation topology and power factor correction, therefore it is widely used in the driver circuit of light-emitting diodes (LED). However, the flyback converter requires a narrow bandwidth to obtain a better power factor correction function, which deteriorates the dynamic performance of the LED driver circuit. Therefore, during the startup stage of the driver circuit, a large voltage spike is generated across the switching device inside the flyback converter, which easily causes damage to the switching device.

In the prior art, this problem is generally solved by selecting a switching device having a higher rated voltage, but this leads to a significant cost increase.

Although the control circuit of the flyback converter generally comprises a built-in soft-start circuit, the parameters of the built-in soft-start circuit cannot be flexibly adjusted, thus it may not be applicable to a specific driver circuit.

Therefore, it is necessary to provide a new power converter, power conversion method, and lighting apparatus to solve at least one of the above problems.

SUMMARY

A power converter comprising a first capacitor, a flyback conversion module, a soft-start module, and a feedback control module. The flyback conversion module is coupled with the first capacitor and configured to receive a first control voltage across the first capacitor. The soft-start module is coupled with the first capacitor and is configured to charge the first capacitor during a startup stage, to increase the first control voltage to an expected voltage value at the end of the startup stage. The feedback control module is coupled with the flyback conversion module and is configured to control the flyback conversion module to output a substantially constant voltage or current after the startup stage. Wherein the expected voltage value is a value of the first control voltage when the flyback conversion module outputs a substantially constant voltage or current after the startup stage.

A power conversion method comprising controlling a flyback conversion module to convert energy by a first control voltage across a first capacitor. The step comprises charging the first capacitor during a startup stage to increase the first control voltage to an expected voltage value at an end of the startup stage; and controlling the flyback conversion module to output a substantially constant voltage or current after the startup stage, wherein the expected voltage value is equal to a value of the first control voltage when the flyback conversion module outputs a substantially constant voltage or current after the startup stage.

A lighting apparatus, comprising: a light emitting diode (LED) and a power converter. The power converter is coupled with the LED and configured to convert energy from a power source and output the converted energy to the LED. The power converter comprising a first capacitor, a flyback conversion module, a soft-start module, and a feedback control module. The flyback conversion module is coupled with the first capacitor and configured to receive a first control voltage across the first capacitor. The soft-start module is coupled with the first capacitor and is configured to charge the first capacitor during a startup stage, to increase the first control voltage to an expected voltage value at the end of the startup stage. The feedback control module is coupled with the flyback conversion module and is configured to control the flyback conversion module to output a substantially constant voltage or current after the startup stage. Wherein the expected voltage value is a value of the first control voltage when the flyback conversion module outputs a substantially constant voltage or current after the startup stage.

BRIEF DESCRIPTION OF DRAWINGS

These and other features, aspects and advantages of the present invention will become better understood when the following detailed description is read with reference to the accompanying drawings, in which like reference numerals are used throughout the drawings to refer to like parts, where.

DETAILED DESCRIPTION OF EMBODIMENTS

The embodiments of the present invention will be described below in detail with reference to the accompanying drawings in order to facilitate those skilled in the art to exactly understand the subject matter claimed by the present invention. In the following detailed description of these specific embodiments, the present specification does not describe in detail any of the known functions or configurations, to avoid unnecessary details that may affect the disclosure of the present invention.

Unless otherwise defined, the technical and scientific terms used in the claims and the specification are as they are usually understood by those skilled in the art to which the present invention pertains. "First", "second" and similar words used in the specification and the claims do not denote any order, quantity or importance, but are merely intended to distinguish between different constituents. The terms "one", "a" and similar words are not meant to be limiting, but rather denote the presence of at least one. "Comprising", "consisting of" and similar words mean that the elements or articles appearing before "comprising" or "consisting of" include the elements or articles and their equivalent elements appearing behind "comprising" or "consisting of", not excluding any other elements or articles. "Connected", "coupled" and similar words are not restricted to physical or mechanical connections, but may also include electrical connections, whether direct or indirect.

Embodiments of the present invention relate to a power converter that can be widely used in a driver circuit of an electrical device, such as a light emitting diode (LED).

Figure 1:
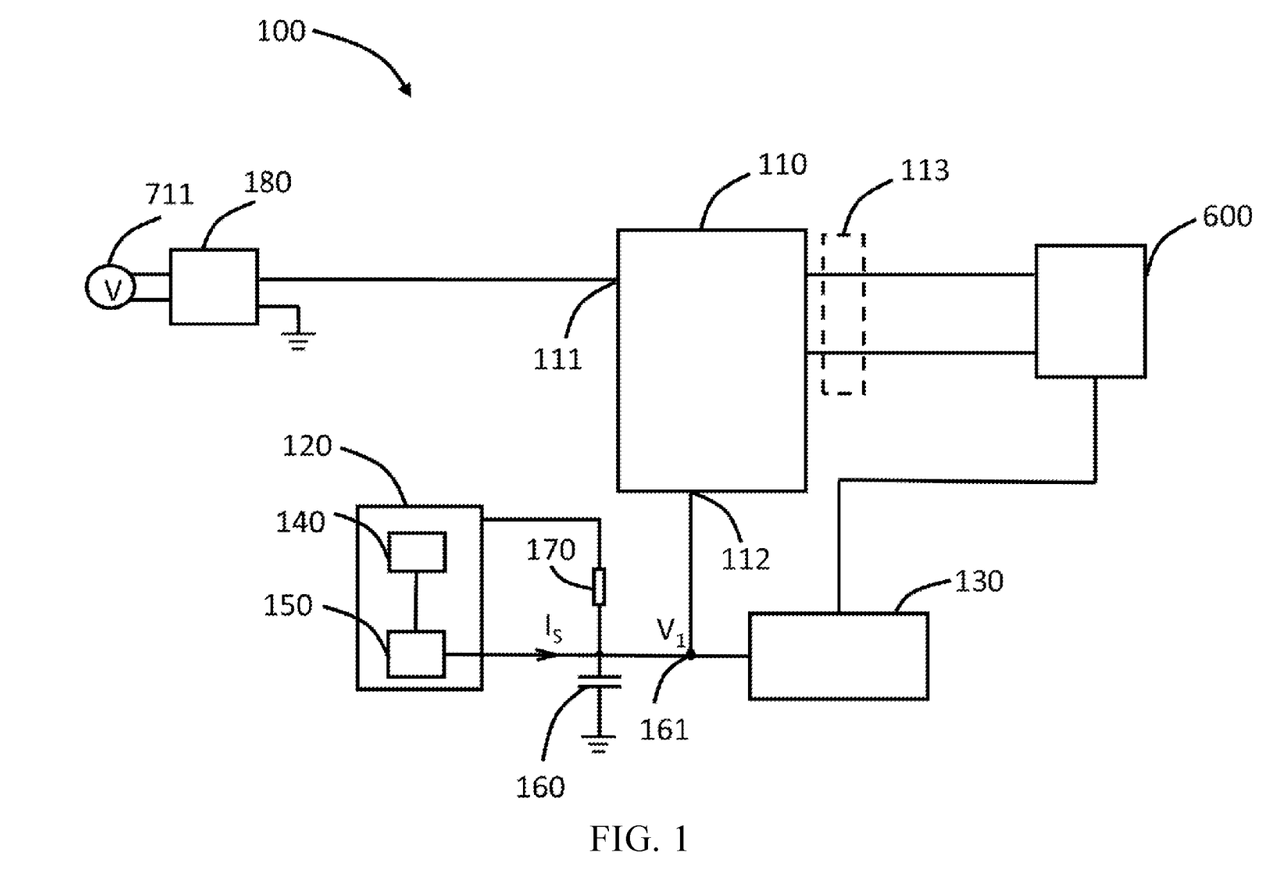
FIG. 1 is a schematic diagram of a power converter according to an embodiment of the present invention.

FIG. 1 is a schematic diagram of a power converter according to an embodiment of the present invention. Referring to FIG. 1, a power converter 100 is coupled between a power source 711 and a load 600, configured to convert energy from a power source 711 and output it to a load 600. In some embodiments, the power converter 100 outputs a constant current or voltage to a load 600.

In the embodiment shown in FIG. 1, the power converter 100 comprising a rectifier 180, a flyback conversion module 110, a soft-start module 120, a feedback control module 130, a first capacitor 160, and a pull-up resistor 170.

The rectifier 180 is coupled between the power source 711 and the flyback conversion module 110, configured to rectify the voltage from the power source 711 and output the rectified voltage to the flyback conversion module 110.

The flyback conversion module 110 comprises an energy input terminal 111, a control signal input terminal 112, and an energy output terminal 113. The energy input terminal 111 is coupled with the rectifier 180 for receiving a voltage that is rectified by the rectifier 180. The control signal input terminal 112 is coupled at the node 161 between the pull-up resistor 170, the first capacitor 160 and the feedback control module 130, configured to receive the first control voltage $V_1$ across the first capacitor 160. The flyback conversion module 110 converts the received energy under the control of the first control voltage $V_1$ and outputs the converted energy to the load 600. In some embodiments, during normal operating stage, the flyback conversion module 110 outputs a substantially constant voltage or current to the load 600 based on the rectified voltage it receives and the first control voltage $V_1$. In some embodiments, the load 600 comprises a light emitting diode (LED) or other household appliances.

The soft-start module 120 is coupled at the node 161 between the pull-up resistor 170 and the first capacitor 160, configured to output a charging current $I_s$ to the first capacitor 160 during the startup stage to charge the first capacitor 160, thereby increasing the first control voltage $V_1$ to an expected voltage value $V_e$ at the end of the startup stage.

Specifically, the soft-start module 120 comprises a current source 140 and a charge time control module 150. The current source 140 is coupled with the first capacitor 160 configured to output a charging current $I_s$ to the first capacitor 160; the charge time control module 150 is coupled between the current source 140 and the first capacitor 160 for disconnecting the connection between the current source 140 and the first capacitor 160 at the end of the startup stage, thereby terminate the charging of the first capacitor 160, while at this time the voltage across the first capacitor 160 is the expected voltage value $V_e$.

In some embodiments, the charging current $I_s$ is a substantially constant current, and the current value is also represented by $I_s$; the first capacitor 160 has a first capacitance value represented by $C_1$, the duration of the startup stage is represented by $T_s$, with $I_s$, $C_1$, $V_e$, $T_s$ satisfying the following relationship: $I_s = C_1 * V_e / T_s$. The duration $T_s$ of the startup stage can be calculated based on various parameters of the flyback conversion module 110, the feedback control module 130, the pull-up resistor 170, the first capacitor 160, and the load 600.

The feedback control module 130 is coupled between the load 600 and the flyback conversion module 110; specifically, it is coupled between the load 600 and the node 161, configured to control the flyback conversion module in order to output a substantially constant voltage or current after the startup stage; at this time, the value of the first control voltage $V_1$ is substantially equal to the expected voltage value $V_e$. Since the value of the first control voltage $V_1$ has been increased to the expected voltage value $V_e$ at the end of the startup stage, when the power converter 100 is switched from the startup stage to the normal operating stage (i.e., after the startup stage), the value of a first control voltage $V_1$ does not change drastically, therefore the switching device in the flyback conversion module is not damaged.

The pull-up resistor 170 and the first capacitor 160 are connected in series with each other, the first end of the pull-up resistor 170 is coupled with the soft-start module 120, the second end of the pull-up resistor 170 is coupled with the first end of the first capacitor 160, while the second end of the first capacitor 160 is grounded. In the embodiment of FIG. 1, the pull-up resistor 170 is powered by an auxiliary source within the soft-start module 120; in other embodiments, a separate auxiliary source can be provided to power the pull-up resistor 170.

Figure 2:
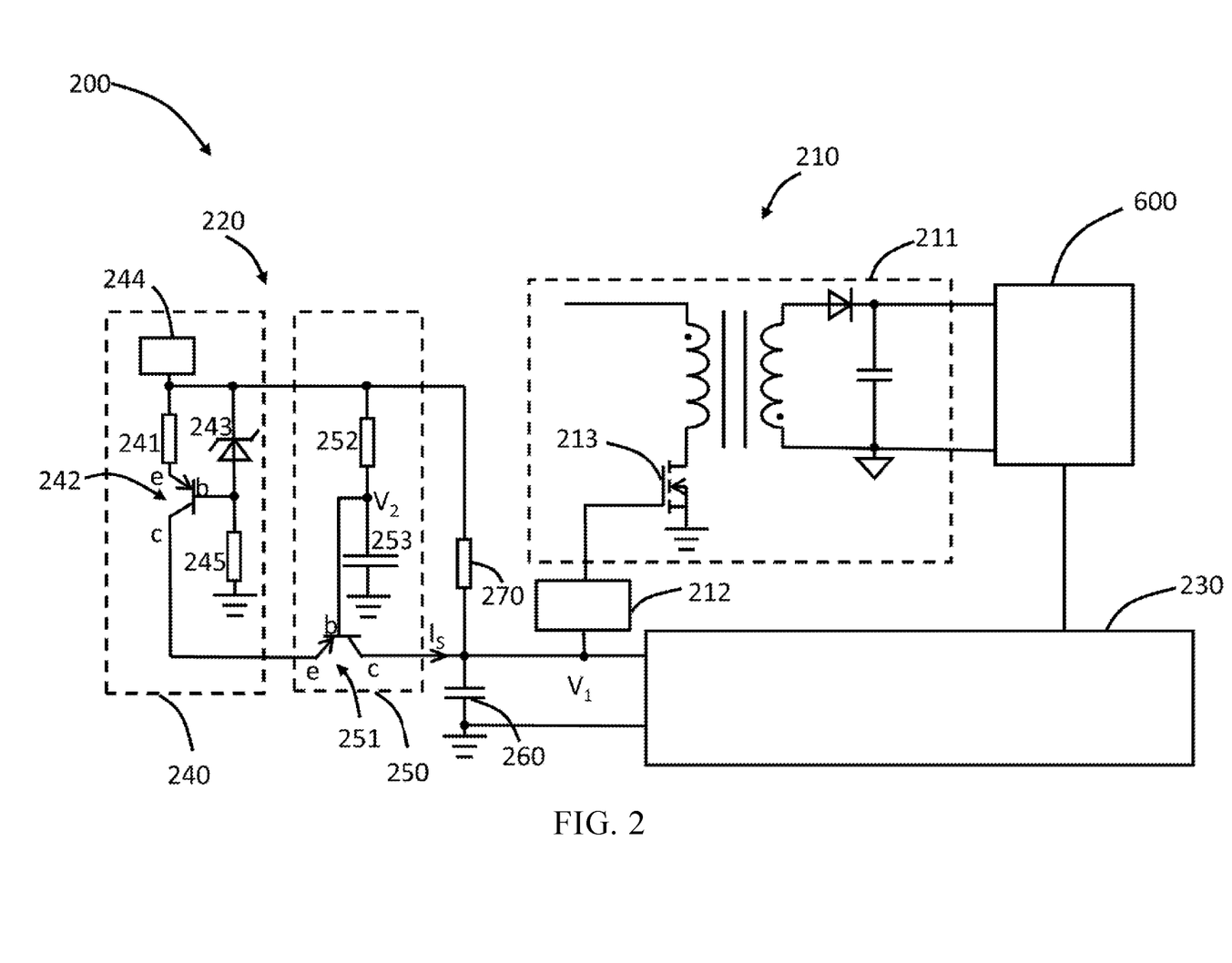
FIG. 2 is a schematic diagram of a power converter according to another embodiment of the present invention.

FIG. 2 shows another embodiment of a power converter. Referring to FIG. 2, the power converter 200 comprises a flyback conversion module 210, a soft-start module 220, a feedback control module 230, a first capacitor 260, and a pull-up resistor 270.

The flyback conversion module 210 comprises a flyback converter 211 and a control circuit 212. The flyback converter 211 comprises a controllable switch 213. The control circuit 212 is coupled between the control end of the controllable switch 213 and the first capacitor 260, configured to receive the first control voltage $V_1$ across the first capacitor 260 and output a control signal to the controllable switch 213, in order to control the controllable switch 213 to be turned on or off. In some embodiments, the longer the controllable switch 213 is turned on, the greater the voltage or current output by the flyback converter 211.

The soft-start module 220 comprises a current source 240 and a charge time control module 250.

In some embodiments, a current source 240 is configured to output a substantially constant charging current $I_s$. The current source 240 comprises a first resistor 241, a first semiconductor device 242, and a voltage stabilizer 243. The first resistor 241 comprises a first end and a second end; the first semiconductor device 242 and the first resistor 241 are connected in series between the first auxiliary source 244 and the first capacitor 260, wherein one end of the first semiconductor device 242 (non-control end) is connected to the second end of the first resistor 241. During the startup stage, the first auxiliary source 244 provides a charging current to the first capacitor 260 via the first resistor 241 and the first semiconductor device 242. The voltage stabilizer 243 is connected between the first end of the first resistor 241 and the control end of the first semiconductor device 242 for stabilizing the voltage between the two ends. Since the magnitude of the charging current Is depends on the resistance of the first resistor 241 and the regulated value of the voltage stabilizer 243, the required magnitude of the charging current $I_s$ can be obtained by selecting the resistance of the first resistor 241 and the regulated value of the voltage stabilizer 243.

In the embodiment shown in FIG. 2, the first semiconductor device comprises a PNP bipolar transistor 242, and the voltage stabilizer comprises a Zener diode 243. Current source 240 further comprises a third resistor 245. The first end of the first resistor 241 is coupled with the first auxiliary source 244, and the second end thereof is coupled with the emitter of the PNP bipolar transistor 242. The collector of the PNP bipolar transistor 242 is coupled with the first end of first capacitor 260 via a charge time control module 250. The Zener diode 243 is connected across the first end of the first resistor 241 (i.e., the output of the first auxiliary source 244) and the control end of the PNP bipolar transistor 242, the anode of the Zener diode 243 is coupled with the control end of the PNP bipolar transistor 242, and the cathode of the Zener diode 243 is coupled to the first end of the first resistor 241 (i.e., the output of the first auxiliary source 244). The first end of the third resistor 245 is coupled with the control end of the first semiconductor device 242, and the second end thereof is grounded.

Thus, the Zener diode 243 maintains the sum of the voltage across the first resistor and the PN junction voltage drop of the bipolar transistor. When the charging current $I_s$ flowing through the first resistor 241 and the bipolar transistor 242 increases, the voltage drop across the first resistor 241 increases, and the PN junction voltage drop of the bipolar transistor 242 is correspondingly reduced, such that the conductive capability of the bipolar transistor 242 is weakened, resulting in a decrease in the charging current $I_s$. On the other hand, when the charging current $I_s$ flowing through the first resistor 241 and the bipolar transistor 242 decreases, the voltage drop across the first resistor 241 decreases, and the PN junction voltage drop of the bipolar transistor 242 is correspondingly increased, such that the conductive capability of the bipolar transistor 242 is strengthened, resulting in an increase in the charging current $I_s$.

In some embodiments, the Zener diode 243 may be replaced by a transient voltage suppressor (TVS), the function and connection of which are similar to the above embodiments, and are not described again herein.

The charge time control module 250 comprises a second semiconductor device 251, a second resistor 252, and a second capacitor 253. The first end of the second resistor 252 is coupled with the output end of the first auxiliary source 244, the second end of the second resistor 252 is coupled with the first end of the second capacitor 253, and the second end of the second capacitor 253 is grounded; thus, the first auxiliary source 244 charges the second capacitor 253 via the second resistor 252 during the startup stage.

A second semiconductor device 251 is coupled between the current source 240 and the first capacitor 260, which is configured to turn off at the end of the startup stage to break up the connection between the current source 240 and the first capacitor 260. Specifically, the high voltage end of the second semiconductor device 251 is coupled with the current source 240, e.g., the low voltage end of the first semiconductor device 242 in the current source 240, and the low voltage terminal of the second semiconductor device 251 is coupled with the first capacitor 260; the first end of the second semiconductor device 251 is coupled between the second resistor 252 and the second capacitor 253 (i.e., the first end of the second capacitor 253); thus, the control end of the second semiconductor device 251 receives the second control voltage $V_2$ from both ends of the second capacitor, which is controlled by the second control voltage $V_2$. During the startup stage, the first auxiliary source 244 charges the second capacitor 253 such that the second control voltage $V_2$ across the second capacitor 253 gradually increases, that is, the potential of the control end of the second semiconductor device 251 gradually increases; when the potential of the control end increases to greater than or equal to the high voltage end of the second semiconductor device 251, the second semiconductor device is turned off, the connection between the current source 240 and the first capacitor 260 is broken, and the first control voltage across the first capacitor 260 $V_1$ is no longer increased. The charging rate of the second capacitor 253 depends on its capacitance value and the resistance value of the second resistor 252. Thus, the parameters of the second capacitor 253 and the second resistor 252 can be set based on the duration of the startup stage, thereby controlling the charging rate of the second capacitor 253 such that the second semiconductor device 251 is turned off approximately at the end of the startup stage.

The second semiconductor device 251 comprises a bipolar transistor, a metal oxide semiconductor field effect transistor (MOSFET), or a combination thereof. In the embodiment shown in FIG. 2, the second semiconductor device 251 is a PNP bipolar transistor comprising a base coupled with the first end of the second capacitor 253, an emitter coupled with the collector of the first semiconductor device 242, and a collector coupled with the first end of the first capacitor 260.

In other embodiments, the charge time control module 250 may comprise a controllable switch coupled between the current source and the first capacitor, which is configured to turn off at the end of the startup stage.

In the actual circuit design, first, the duration $T_s$ of the startup stage is obtained based on the various parameters of the flyback conversion module 210, the feedback control module 230, the pull-up resistor 270, the first capacitor 260, and the load 600; the duration $T_s$ is used to design the capacitance value of the second capacitor 253 and the resistance value of the second resistor 252; then, the magnitude of the charging current $I_s$ is determined according to the expected voltage value $V_e$, the duration $T_s$ of the startup stage, the first capacitance value $C_1$, and the relationship $I_s = C_1 * V_e / T_s$; finally, the resistance of the first resistor 241 and the regulated value of the voltage stabilizer 243 are designed according to the magnitude of $I_s$.

Figure 3:
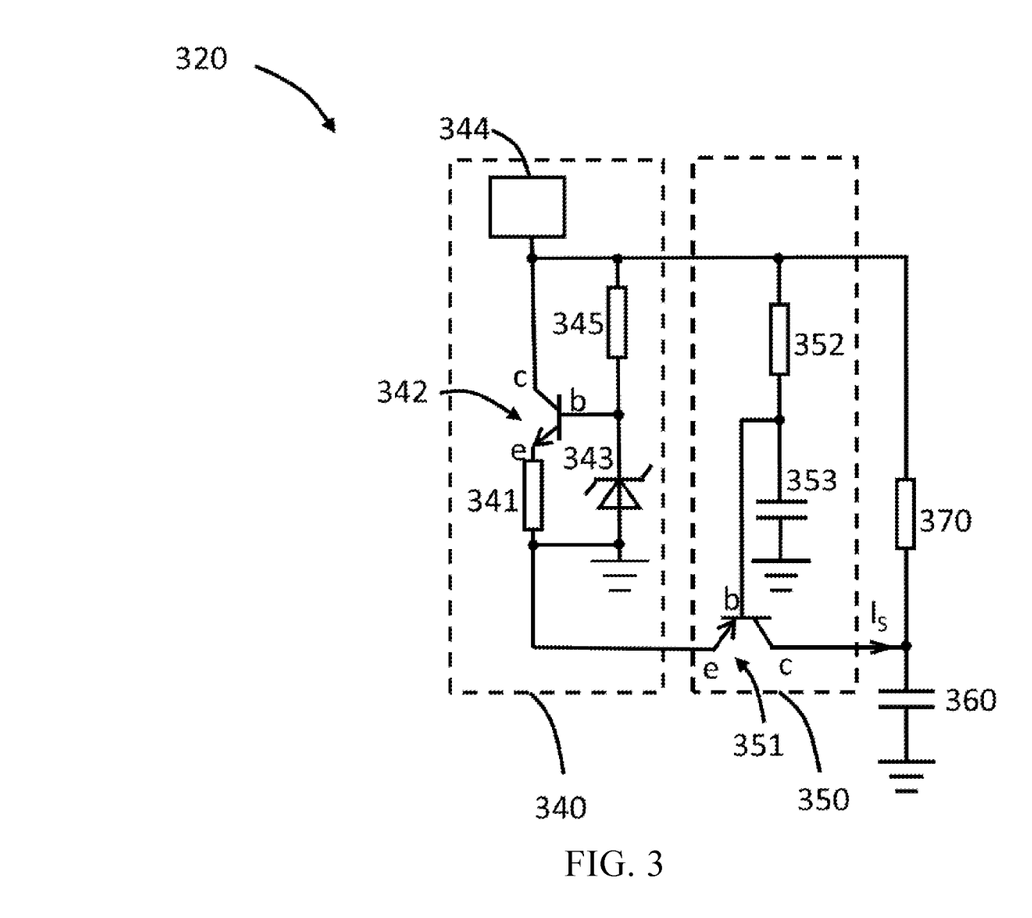
FIG. 3 is a schematic diagram of a soft-start module according to an embodiment of the invention.

FIG. 3 is a schematic diagram of a soft-start module 320 according to another embodiment of the present invention. Referring to FIG. 3, the soft-start module 320 comprises a current source 340 and a charge time control module 350.

The current source 340 comprises a first resistor 341, a first semiconductor device 342, and a voltage stabilizer 343. The first resistor 341 comprises a first end and a second end; the first semiconductor device 342 and the first resistor 341 are connected in series between the first auxiliary source 344 and the first capacitor 360, wherein one end of the first semiconductor device 342 (non-control end) is connected to the second end of the first resistor 341. During the startup stage, the first auxiliary source 344 provides a charging current to the first capacitor 360 via the first semiconductor device 342 and the first resistor 341. The voltage stabilizer 343 is connected between the first end of the first resistor 341 and the control end of the first semiconductor device 342 for stabilizing the voltage between the two ends.

In the embodiment shown in FIG. 3, the first semiconductor device comprises an NPN bipolar transistor 342, and the voltage stabilizer comprises a Zener diode 343. Current source 340 further comprises a third resistor 345. The collector of the NPN bipolar transistor 342 is coupled with the first auxiliary source 344, and the emitter thereof is coupled with the second end of the first resistor 341, the first end of the first resistor 341 is coupled with the first end of the first capacitor 360 via the charge time control module. The Zener diode 343 is connected between the first end of the first resistor 341 and the control end of the NPN bipolar transistor 342, the cathode of the Zener diode 343 is coupled with the control end of the NPN bipolar transistor 342, the anode of the Zener diode 343 is grounded and is coupled with a first end of first resistor 341. The third resistor 345 is coupled between the output of the first auxiliary source 344 and the control end of the NPN bipolar transistor 342.

Thus, the Zener diode 343 maintains the sum of the voltage across the first resistor and the PN junction voltage drop of the bipolar transistor. When the charging current $I_s$ flowing through the bipolar transistor 342 and the first resistor 341 increases, the voltage drop across the first resistor 341 increases, and the PN junction voltage drop of the bipolar transistor 342 is correspondingly reduced, such that the conductive capability of the bipolar transistor 342 is weakened, resulting in a decrease in the charging current $I_s$. On the other hand, when the charging current $I_s$ flowing through the bipolar transistor 342 and the first resistor 341 decreases, the voltage drop across the first resistor 341 decreases, and the PN junction voltage drop of the bipolar transistor 342 is correspondingly increased, such that the conductive capability of the bipolar transistor 342 is strengthened, resulting in an increase in the charging current $I_s$.

The charge time control module 350 comprises a second semiconductor device 351, a second resistor 352, and a second capacitor 353, whose connecting method and functions are similar with the second semiconductor device 251, the second resistor 252, and the second capacitor 253 shown in FIG. 2, respectively, and will not be described again herein.

Figure 4:
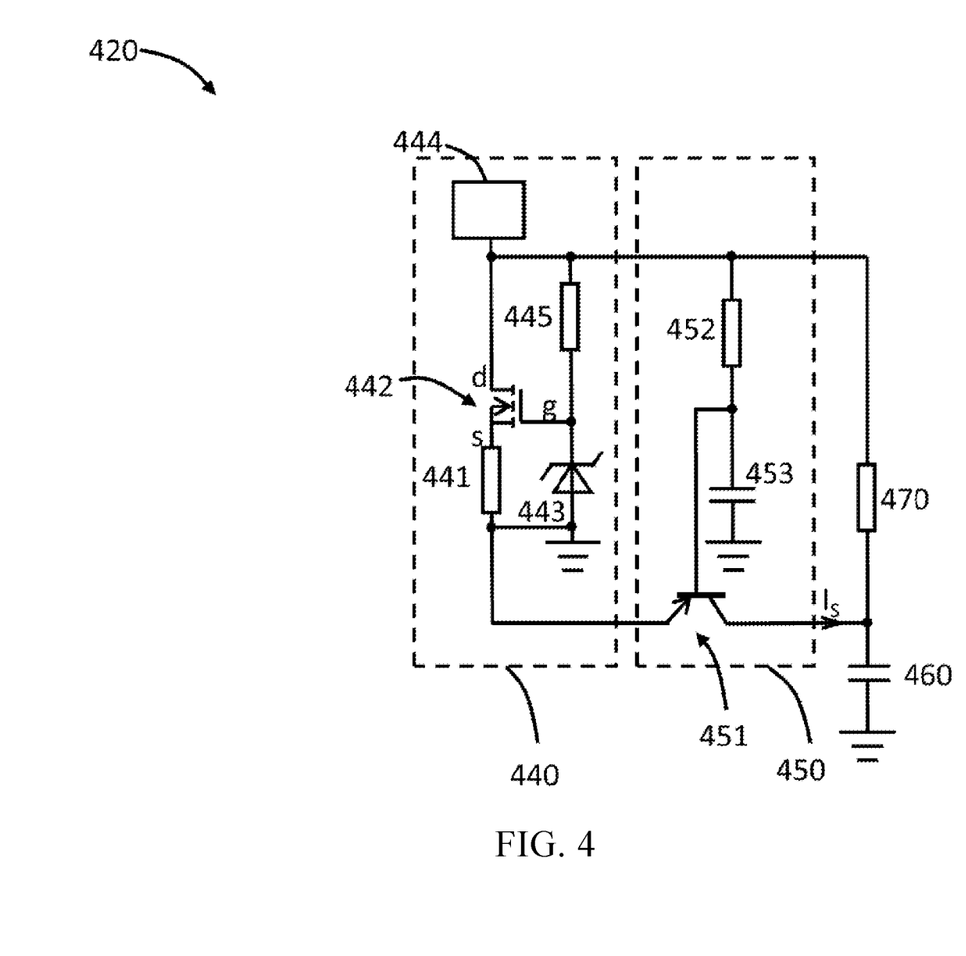
FIG. 4 is a schematic diagram of a soft-start module according to another embodiment of the present invention.

FIG. 4 is a schematic diagram of a soft-start module 420 according to another embodiment of the present invention. Referring to FIG. 4, the soft-start module 420 comprises a current source 440 and a charge time control module 450.

The current source 440 comprises a first resistor 441, a first semiconductor device 442, and a voltage stabilizer 443. The first resistor 441 comprises a first end and a second end; the first semiconductor device 442 and the first resistor 441 are connected in series between the first auxiliary source 444 and the first capacitor 460, wherein one end of the first semiconductor device 442 (non-control end) is connected to the second end of the first resistor 441. During the startup stage, the first auxiliary source 444 provides a charging current to the first capacitor 460 via the first semiconductor device 442 and the first resistor 441. The voltage stabilizer 443 is connected between the first end of the first resistor 441 and the control end of the first semiconductor device 442 for stabilizing the voltage between the two ends.

In the embodiment shown in FIG. 4, the first semiconductor device comprises a metal oxide semiconductor field effect transistor (MOSFET) 442, and the voltage regulator comprises a Zener diode 443. Current source 440 further comprises a third resistor 445. The drain of the MOSFET 442 is coupled with the first auxiliary power supply 444, the source thereof is coupled with the second end of the first resistor 441, and the first end of the first resistor 441 is coupled with the first end of the first capacitor 460 via the charge time control module 450. The Zener diode 443 is connected between the first end of the first resistor 441 and the control end of the MOSFET 442, the cathode of the Zener diode 443 is coupled with the control end of the MOSFET 442, the anode of the Zener diode 443 is grounded and is coupled with the first end of the resistor 441. The third resistor 445 is coupled between the output of the first auxiliary source 444 and the control end of the MOSFET 442.

Thus, the Zener diode 443 maintains the sum of the voltage across the first resistor and the gate-to-source voltage drop (Vgs) of the MOSFET. When the charging current $I_s$ flowing through the MOSFET 442 and the first resistor 441 increases, the voltage drop across the first resistor 441 increases, and the gate-to-source voltage drop of the MOSFET 442 is correspondingly reduced, such that the conductive capability of the MOSFET 442 is weakened, resulting in a decrease in the charging current $I_s$. On the other hand, when the charging current $I_s$ flowing through the MOSFET 442 and the first resistor 441 decreases, the voltage drop across the first resistor 441 decreases, and the gate-to-source voltage drop of the MOSFET 442 is correspondingly increased, such that the conductive capability of the bipolar transistor 442 is strengthened, resulting in an increase in the charging current $I_s$.

The charge time control module 450 comprises a second semiconductor device 451, a second resistor 452, and a second capacitor 453, whose connecting method and functions are similar with the second semiconductor device 251, the second resistor 252, and the second capacitor 253 shown in FIG. 2, respectively, and will not be described again herein.

Figure 5:
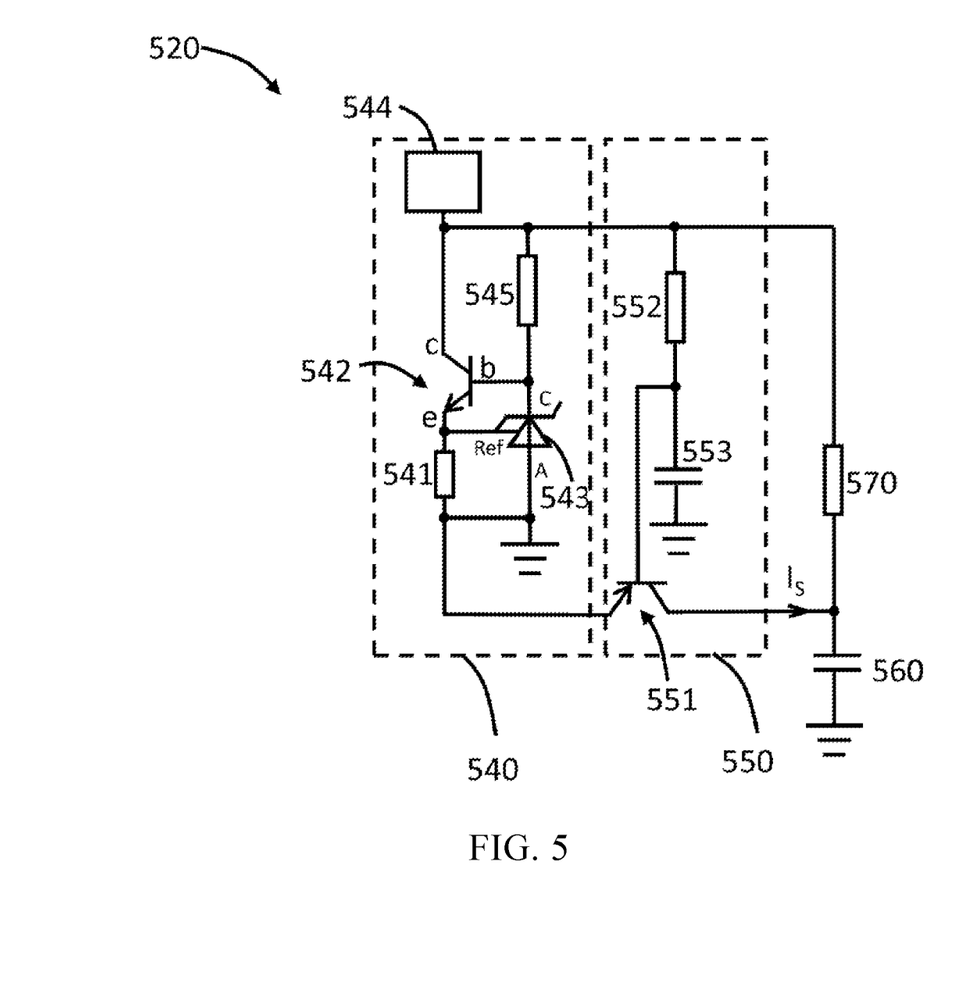
FIG. 5 is a schematic diagram of a soft-start module according to another embodiment of the present invention.

FIG. 5 is a schematic diagram of a soft-start module 520 according to another embodiment of the present invention. Referring to FIG. 5, the soft-start module 520 comprises a current source 540 and a charge time control module 550.

The current source 540 comprises a first resistor 541, a first semiconductor device 542, and a voltage stabilizer 543. The first resistor 541 comprises a first end and a second end; the first semiconductor device 542 and the first resistor 541 are connected in series between the first auxiliary source 544 and the first capacitor 560, wherein one end of the first semiconductor device 542 (non-control end) is connected to the second end of the first resistor 541. During the startup stage, the first auxiliary source 544 provides a charging current to the first capacitor 560 via the first semiconductor device 542 and the first resistor 541. The voltage stabilizer 543 is connected between the first end of the first resistor 541 and the control end of the first semiconductor device 542 for stabilizing the voltage between the two ends.

In the embodiment shown in FIG. 5, the first semiconductor device comprises an NPN bipolar transistor 542, and the voltage regulator comprises a shunt regulator integrated circuit, such as TL431543. Current source 540 further comprises a third resistor 545. The collector of the NPN bipolar transistor 542 is coupled with the first auxiliary source 544, the emitter electrode thereof is coupled with the second end of the first resistor 541, the first end of the first resistor 541 is coupled with the first end of the first capacitor 560 via the charge time control module 550. The third resistor 545 is coupled between the output of the first auxiliary source 544 and the control end of the NPN bipolar transistor 542.

The TL431543 is connected across the first end of the first resistor 541 and the control end of the NPN bipolar transistor 542. Specifically, the cathode (C) of the TL431543 is coupled with the control end of the NPN bipolar transistor 542; the anode (A) of the TL431543 is grounded and coupled with the first end of the first resistor 541; and the reference pole (Ref) of the TL431543 is coupled with the second end of the first resistor 541, that is, the emitter of the NPN bipolar transistor 542.

The charge time control module 550 comprises a second semiconductor device 551, a second resistor 552, and a second capacitor 553, whose connecting method and functions are similar with the second semiconductor device 251, the second resistor 252, and the second capacitor 253 shown in FIG. 2, respectively, and will not be described again herein.

Figure 6:
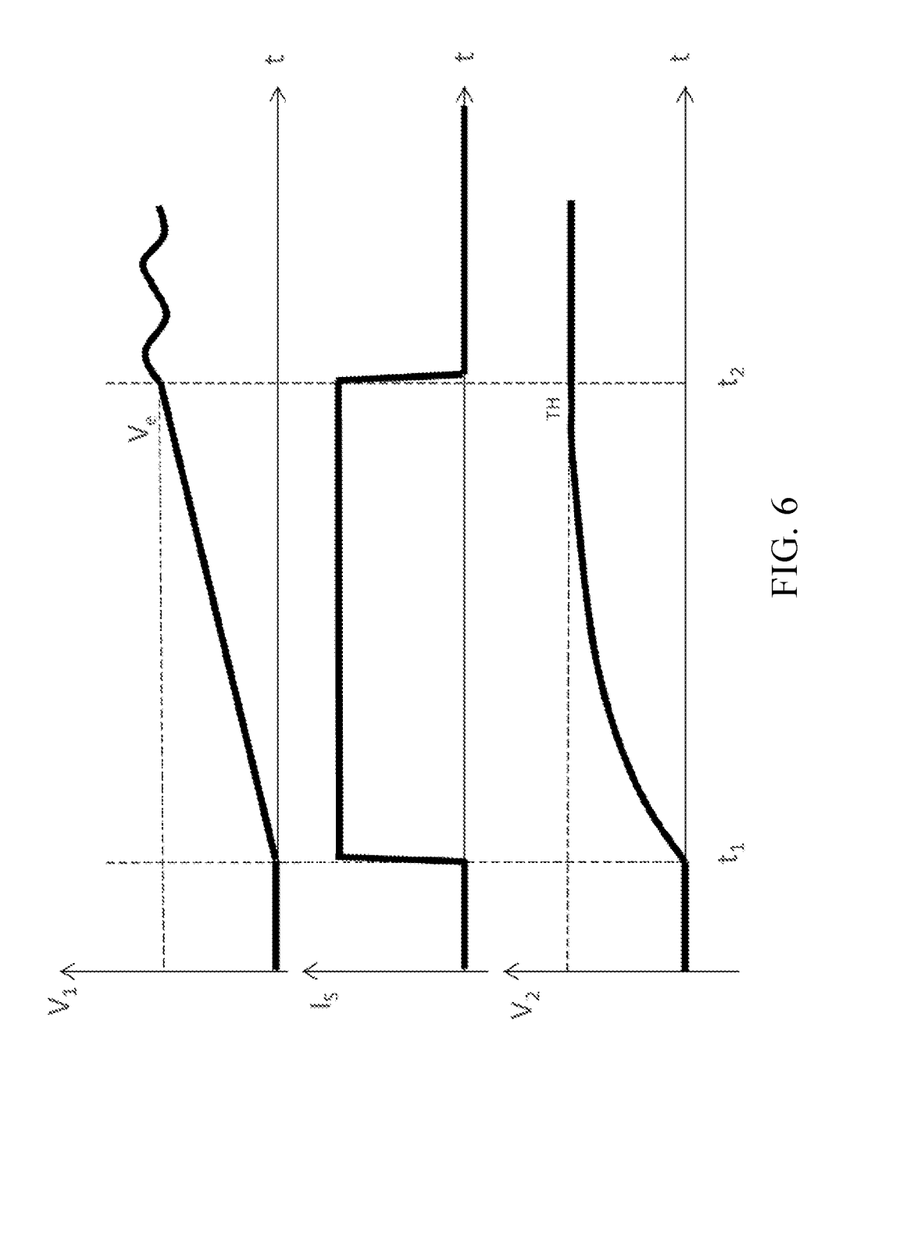
FIG. 6 is a schematic diagram showing waveforms of a first control voltage, a second control voltage, and a charging current according to the embodiment shown in FIG. 2.

FIG. 6 is a waveform diagram of the first control voltage $V_1$, the charging current $I_s$, and the second control voltage $V_2$ according to the embodiment shown in FIG. 2.

Referring to FIG. 6, $t_1$-$t_2$ is the startup stage of the power converter, and $t_2$ is the normal operating stage of the power converter. The duration of this startup stage is $T_s = t_2 - t_1$.

During the startup stage $t_1$-$t_2$, $I_s$ remains substantially constant, which charges the first capacitor such that the voltage value of $V_1$ linearly increases at a certain rate during this stage, such that the voltage value of $V_1$ increases to around the expected voltage value $V_e$ at time $t_2$.

As shown in FIG. 6, during the startup stage ($t_1$-$t_2$), the second control voltage $V_2$ also increases continuously. At time $t_2$, the second control voltage $V_2$ increases to the cutoff threshold TH of the second semiconductor device; therefore, after time $t_2$, the second semiconductor device is turned off, resulting in the connection between the current source 240 and the first capacitor 260 being disconnected, followed by $I_s$ becoming 0 and the first capacitor 260 no longer being charged.

After the time $t_2$, the feedback control module 230 begins to operate and controls the flyback conversion module to output a substantially constant voltage or current; at this time, the voltage value of the first control voltage is also around the expected voltage value $V_e$.

It can be seen from the waveform diagram that the disclosed embodiment can make the first control voltage $V_1$ switch from the startup stage to the normal operating stage (at time $t_2$), which has a smooth transition, and the feedback control module does not overshoot, which can effectively reduce the voltage spikes at both ends of the controllable switch 213, thereby avoiding damage to the controllable switch.

Embodiments of the present invention also relate to a lighting apparatus comprising a light emitting diode (LED) and a power converter. The power converter is coupled with the LED and configured to convert energy from a power source and output the converted energy to the LED.

The structure and function of the power converter are similar to those of the power converter disclosed above and in FIGS. 1-5, and are not described again herein.

Embodiments of the present invention also relate to a power conversion method that controls a flyback conversion module for energy conversion through a first control voltage across a first capacitor.

Figure 7:
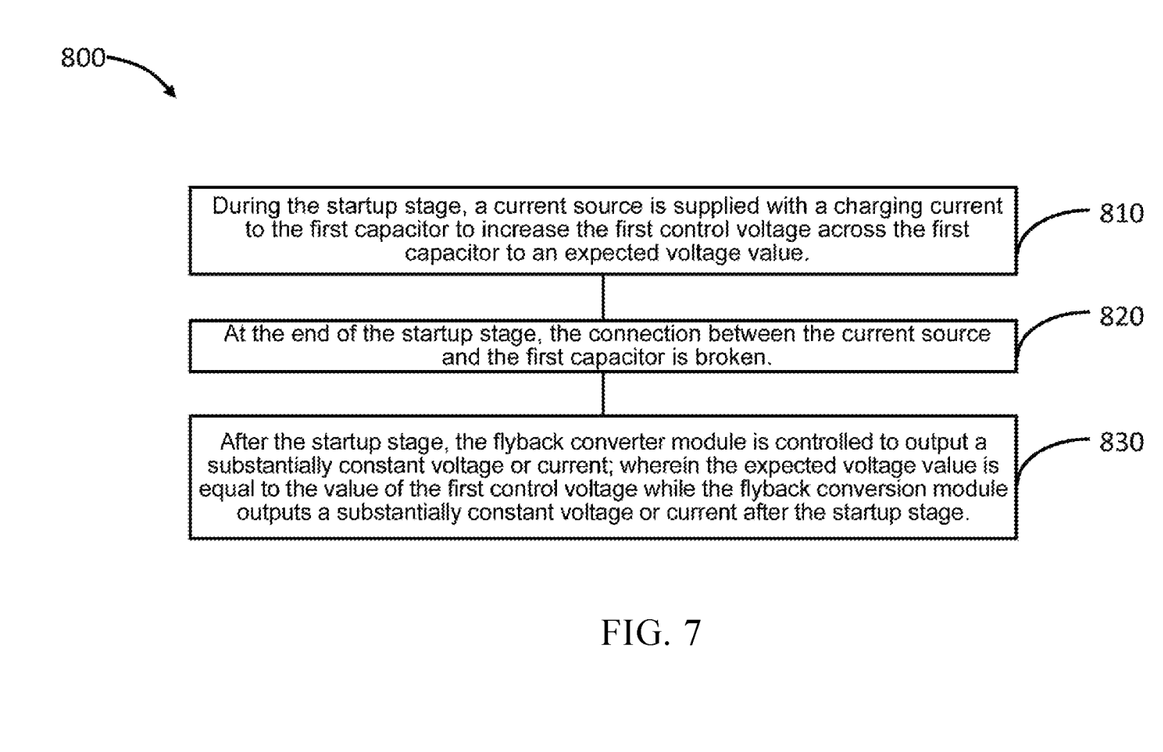
FIG. 7 is a schematic flow chart of a power conversion method according to an embodiment of the present invention.

Referring to FIG. 7, the power conversion method 800 comprises steps 810-830.

Steps 810-820 involve charging the first capacitor during the startup stage such that the first control voltage increases to an expected voltage value at the end of the startup stage. Specifically, in step 810, during the startup stage, a charging current is supplied to the first capacitor through a current source to increase the first control voltage across the first capacitor to an expected voltage value; at the end of the startup stage, the connection between the current source and the first capacitor is broken, as shown in step 820.

Then, as shown in step 830, the flyback conversion module is controlled to output a substantially constant voltage or current after the startup stage; wherein the expected voltage value is equal to the value of the first control voltage while the flyback conversion module outputs a substantially constant voltage or current after the startup stage.

While the present invention has been described in detail with reference to specific embodiments thereof, it will be understood by those skilled in the art that many modifications and variations can be made in the present invention. It is, therefore, to be understood that the appended claims are intended to cover all such modifications and variations insofar as they are within the true spirit and scope of the invention.

We claim:

1. A power converter, comprising:
    a first capacitor;
    a flyback conversion module, coupled with the first capacitor and configured to receive a first control voltage ($V_1$) across the first capacitor and to supply a particular voltage or current to a load;
    a soft start module, coupled with the first capacitor and configured to charge the first capacitor during a startup stage, to increase the first control voltage ($V_1$) to an expected voltage value ($V_e$) at an end of the startup stage, wherein the soft start module comprises:
        a current source, coupled with the first capacitor and configured to provide a charging current to the first capacitor, wherein the charging current is a substantially constant current denoted as Is, which is calculated by: Is=C1*Ve/Ts, wherein Ts represents a time duration of the startup stage, C1 represents a capacitance of the first capacitor, Ve represents the expect voltage value of the first control voltage (V1), and
        a charge time control module, coupled between the current source and the first capacitor, and configured to disconnect the current source from the first capacitor at the end of the startup stage; and
    a feedback control module, coupled with the flyback conversion module at a first node and with the load at a second node and configured to control the flyback conversion module to output a substantially constant voltage or current after the startup stage, wherein the first node is different from the second node, the load having a first side and a second side, wherein the load is electrically coupled to the flyback conversion module at the first side and the load is electrically coupled to the feedback control module at the second side;
    wherein the expected voltage value ($V_e$) is a value of the first control voltage ($V_1$) when the flyback conversion module outputs the substantially constant voltage or current after the startup stage.

2. The power converter according to claim 1, wherein the current source comprises:
    a first resistor having a first terminal and a second terminal;
    a first semiconductor device coupled in series with the first resistor between an auxiliary source and the first capacitor, wherein the first semiconductor device is coupled to the second terminal of the first resistor; and
    a voltage stabilizer coupled between the first terminal of the first resistor and a control terminal of the first semiconductor device.

3. The power converter according to claim 2, wherein the first semiconductor device comprises a bipolar junction transistor, a metal-oxide-semiconductor field-effect transistor or a combination thereof.

4. The power converter according to claim 2, wherein the voltage stabilizer comprises at least one of a zener diode, a transient voltage suppressor and an adjustable shunt regulator.

5. The power converter according to claim 1, wherein the charge time control module comprises a controllable switch coupled between the current source and the first capacitor and configured to be switched off at the end of the startup stage.

6. The power converter according to claim 1, wherein the flyback conversion module comprises:
   a flyback convertor comprising a controllable switch; and
   a control circuit, coupled between the first capacitor and a control terminal of the controllable switch, and configured to receive the first control voltage ($V_1$) and output a control signal to the controllable switch.

7. The power converter according to claim 1, further comprising a rectifier, coupled between the flyback conversion module and a power source.

8. A power converter, comprising:
   a first capacitor;
   a flyback conversion module, coupled with the first capacitor and configured to receive a first control voltage ($V_1$) across the first capacitor;
   a soft start module, coupled with the first capacitor and configured to charge the first capacitor during a startup stage, to increase the first control voltage ($V_1$) to an expected voltage value ($V_e$) at an end of the startup stage, wherein the soft start module comprises:
      a current source, coupled with the first capacitor and configured to provide a charging current to the first capacitor; and
      a charge time control module, coupled between the current source and the first capacitor, and configured to disconnect the current source from the first capacitor at the end of the startup stage; and
   a feedback control module, coupled with the flyback conversion module and configured to control the flyback conversion module to output a substantially constant voltage or current after the startup stage;
   wherein the expected voltage value ($V_e$) is a value of the first control voltage ($V_1$) when the flyback conversion module outputs the substantially constant voltage or current after the startup stage;
   wherein the charge time control module comprises a second semiconductor device coupled between the current source and the first capacitor and configured to be cut off at the end of the startup stage.

9. The power converter according to claim 8, wherein the second semiconductor device comprises at least one of a bipolar junction transistor and a metal-oxide-semiconductor field-effect transistor.

10. The power converter according to claim 8, wherein the charge time control module further comprises a second capacitor, coupled to an auxiliary source and configured to provide a second control voltage (V2) to control the second semiconductor device;
    wherein the auxiliary source is configured to charge the second capacitor to increase the second control voltage (V2) to a threshold value to cut off the second semiconductor device at the end of the startup stage.

11. A power conversion method, comprising:
    controlling a flyback conversion module to convert energy by a first voltage across a first capacitor and to supply a particular voltage or current to a load, wherein the controlling the flyback conversion module comprises:
    charging the first capacitor during a startup stage to increase the first control voltage to an expected voltage value at an end of the startup stage, wherein charging the first capacitor during the startup stage comprises:
       providing a charging current to the first capacitor, wherein the charging current is a substantially constant current denoted as Is, which is calculated by: Is=C1*Ve/Ts, wherein Ts represents a time duration of the startup stage, C1 represents a capacitance of the first capacitor, Ve represents the expect voltage value of the first control voltage (V1), and
       disconnecting the current source from the first capacitor at the end of the startup stage, and
    controlling the flyback conversion module to output a substantially constant voltage or current after the startup stage,
    wherein the expected voltage value is a value of the first control voltage when the flyback conversion module outputs a substantially constant voltage or current after the startup stage, and
    wherein a feedback control module is coupled with the flyback conversion module at a first node and with the load at a second node and is configured to control the flyback conversion module to output a substantially constant voltage or current after the startup stage, the first node being different from the second node, the load having a first side and a second side, wherein the load is electrically coupled to the flyback conversion module at the first side and the load is electrically coupled to the feedback control module at the second side.

12. The method according to claim 11, wherein the charging of the first capacitor comprises:
    providing a charging current to the first capacitor by a current source; and
    disconnecting the current source from the first capacitor at the end of the startup stage.

13. A lighting apparatus, comprising:
    a light-emitting diode (LED); and
    a power converter, coupled to the LED and configured to convert energy from a power source and transport the converted energy to the LED, the power converter comprising:
    a first capacitor,
    a flyback conversion module, coupled with the first capacitor and configured to receive a first control voltage ($V_1$) across the first capacitor and to supply a particular voltage or current to a load,
    a soft start module, coupled with the first capacitor and configured to charge the first capacitor during a startup stage, to increase the first control voltage ($V_1$) to an expected voltage value ($V_e$) at an end of the startup stage, wherein the soft start module comprises:
       a current source, coupled with the first capacitor and configured to provide a charging current to the first capacitor, wherein the charging current is a substantially constant current denoted as Is, which is calculated by: Is=C1*Ve/Ts, wherein Ts represents a time duration of the startup stage, C1 represents a capacitance of the first capacitor, Ve represents the expect voltage value of the first control voltage (V1), and
       a charge time control module, coupled between the current source and the first capacitor, and configured to disconnect the current source from the first capacitor at the end of the startup stage, and
    a feedback control module, coupled with the flyback conversion module at a first node and with the load at a second node and configured to control the flyback conversion module to output a substantially constant voltage or current after the startup stage, wherein the first node is different from the second node, the load having a first side and a second side, wherein the load is electrically coupled to the flyback conversion module at the first side and the load is electrically coupled to the feedback control module at the second side, wherein the expected voltage value ($V_e$) is a value of the first control voltage ($V_1$) when the flyback conversion module outputs the substantially constant voltage or current after the startup stage.

* * * * *